W. LOVE.
MANUFACTURE OF COMPOSITE TUBES.
APPLICATION FILED JAN. 9, 1906.

1,048,326.

Patented Dec. 24, 1912.
2 SHEETS—SHEET 1.

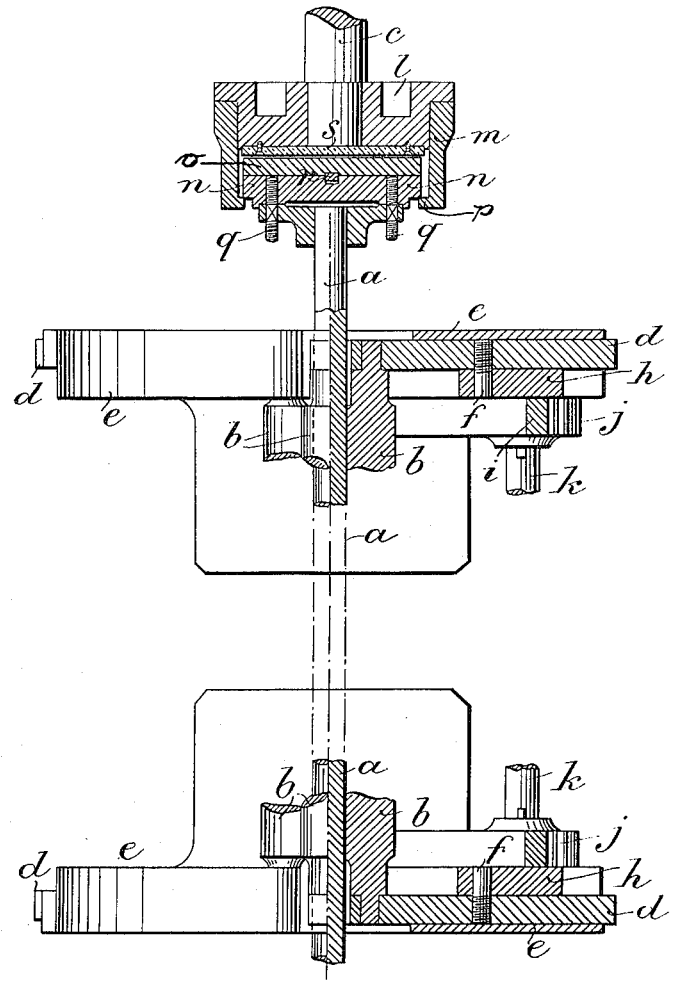

UNITED STATES PATENT OFFICE.

WILLIAM LOVE, OF LONDON, ENGLAND.

MANUFACTURE OF COMPOSITE TUBES.

1,048,326.  Specification of Letters Patent.  Patented Dec. 24, 1912.

Application filed January 9, 1906. Serial No. 295,221.

*To all whom it may concern:*

Be it known that I, WILLIAM LOVE, a subject of the King of Great Britain and Ireland, residing at London, England, have invented Improvements in and Relating to the Manufacture of Composite Tubes, of which the following is a specification.

This invention relates to the preparation of tubes to imitate wood by the combination of paper material, such as strawboard or leather board, with wood in the form of scale-board or veneer, and has for its object to produce tubes and sections of tubes lighter, cheaper, and less liable to warp, wind, or shrink than "moldings" made from timber alone.

The combination of the paper and the wood is made under considerable pressure and it is preferred to effect it by means of the tube machine hereinafter described.

The tubes may have the wood on the inside or on the outside surface or on both, the filling or strengthening material in each case being paper. They can be divided longitudinally or otherwise into any required sections and the surface can be finished, stained, varnished, and polished precisely as in the case of ordinary moldings, which in a vast number of cases they would advantageously replace.

The invention is illustrated by the accompanying drawings, of which—

Figure 1:
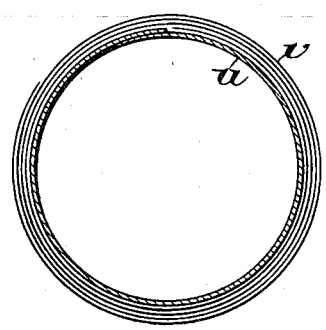
Figure 2:
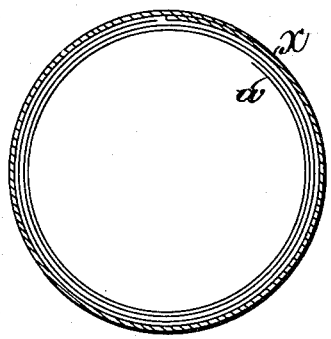
Figure 4:
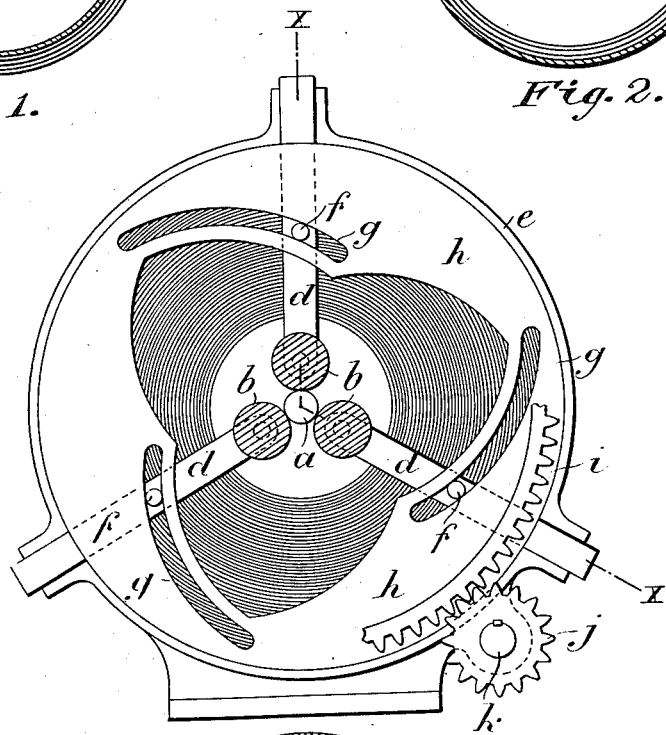
Figure 3:
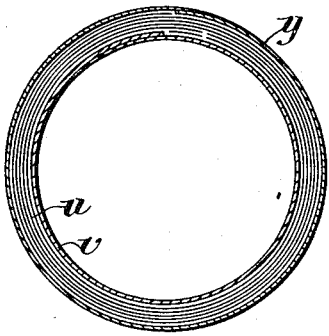

Figure 1 is an end view of a tube having wood surfacing material surrounded by paper strengthening material, Fig. 2 is a similar view of a tube having paper strengthening material surrounded by wood surfacing material, and Fig. 3 is an end view of a tube having wood surfacing material both inside and outside intermediate layers of paper strengthening material, while Fig. 4 and Fig. 5 are respectively a vertical section and a view partly in horizontal section and partly in section corresponding to the radial lines $x$ $x$ of Fig. 4 and illustrate the construction of the preferred tube machine employed in the manufacture of the tubes.

In the machine illustrated by Figs. 4 and 5 a mandrel $a$ on which the sheet material is wound is supported and held by rollers $b$ over the whole of its length with which the sheet material comes into contact, while the driving end of the mandrel is connected to the driving spindle $c$ in such a manner as to enable it to be rotated by the spindle while allowing it to move laterally to the extent required by the thickness of the sheet being wound to enable the sheet material to be acted upon equally by the rollers $b$ notwithstanding the different distances from the axis of the mandrel of the several lines of contact of the rollers $b$. For this purpose each of the rollers $b$ is carried by a pair of parallel bars $d$ mounted to slide in radial grooves in a pair of end supports $e$ each of which has mounted in it as many bars $d$ as there are rollers $b$, the bars $d$ being arranged at equal angular distances apart. Each of the radial bars $d$ has a projection $f$ which engages in one of several spiral like slots $g$ formed at equal angular distances apart in a plate $h$ that is mounted in the corresponding support $e$ and is provided with an arc-shaped rack $i$ engaging in a pinion $j$, the two pinions $j$ being fixed to a common shaft $k$ so that by turning the shaft $k$ by any convenient means, as for example a treadle, the two plates $h$ can be turned more or less as desired and the rollers $b$ thereby moved nearer together or farther apart.

To enable the mandrel $a$, while the sheet material is being wound upon it, to move laterally so as to adjust itself in accordance with the thickness of the sheet being wound upon it and so enable the rollers $b$ to be pressed equally against the material wound upon the mandrel $a$, the mandrel $a$ is connected to the driving spindle $c$ by means of a clutch comprising a face plate $l$ fixed to the shaft $c$, a flanged collar $m$ secured to the plate $l$ and two plates $n$ and $o$ having an external diameter somewhat less than the internal diameter of the collar $m$ and fitting between the plate $l$ and the flange $p$ of the collar $m$ so as to prevent axial play of the plates $n$ and $o$, while the plate $n$, which is attached to the mandrel $a$ by means of studs $q$, is connected to the plate $o$ by a diametral spline $r$ attached to the plate $o$ and fitting in a groove in the plate $n$, and the plate $o$ is connected to the plate $l$ by a diametral spline $s$ attached at right angles to the spline $r$ to the plate $l$ and fitting in a groove in the plate $o$.

To form the tube shown in Fig. 1 a thin sheet $u$ of wood is wound upon the mandrel $a$ to the extent of a little more than one revolution, glue being employed between the overlapping portions of the sheet to connect them together and the inner of the two overlapping portions being thinned off toward its edge so as to produce a smooth cylindrical surface; and upon the tube of wood thus formed there is wound a sheet $v$ of paper material, glue being similarly employed between the adjacent surfaces of the sheet $u$ and the sheet $v$ and of the various convolutions of the sheet $v$. During the entire process the roll of material is kept under the evenly distributed and balanced pressure of the rollers $b$.

In making the tube shown in Fig. 2 a sheet $w$ of paper material is rolled into the form of a tube by means of the machine shown in Figs. 4 and 5, with the interposition of glue between the various convolutions of the paper; and upon the paper tube thus made there is wound a thin sheet $x$ of wood, glue being interposed between the paper and the wood and between the overlapping portions of the sheet $x$, the outer of which is suitably thinned toward its edge to produce a smooth cylindrical surface. Considerable pressure is employed upon the tube by means of the rollers $b$ throughout the operation of its formation.

The tube shown in Fig. 3 is made by forming a tube as described with reference to Fig. 1 and subsequently winding thereon a sheet $y$ of wood as described with reference to Fig. 2.

For the purpose of ornament the tubes made as described may be cut into any desired forms—for example, they may be cut up by means of a fretwork saw into moldings having Vandyck or similar edges.

The paper of a tube constructed according to my invention tends to neutralize the tendency of the wood to warp, wind, or split, while the wood stiffens the tube and at the same time presents a surface capable of being finished exactly in the same way as if the tube were wholly of wood.

What I claim is:—

1. The method of making a composite tube which consists in tapering off one end portion of a layer of wood bending said layer of wood until said tapered end portion overlaps its other end portion, securing said overlapped end portions together by adhesive to form a tube having an inner cylindrical surface, said tube being solidly supported internally, and winding around the tube thus formed a plurality of convolutions of paper in sheet form with interposed adhesive material, under the combined action of a turning force transmitted from the wood tube and independent compressing forces applied exteriorly to the tube along separate longitudinal lines spaced around the tube, so as to produce a dragging action on the convolutions of paper, substantially as described.

2. The herein described method of making a composite tube, which consists in bending a layer of wood into tubular form so that its end portions overlap one another the inner end portion being of taper section to form a smooth inner cylindrical surface securing the said overlapping portions with adhesive, winding around the tube thus formed and while solidly supported internally, a plurality of convolutions of paper in sheet form with interposed adhesive material, winding around the paper a second layer of wood the end portions of which overlap one another adhesive being interposed between the paper and second layer of wood, the outer overlapping portion of said second layer of wood being tapered to impart a smooth external cylindrical surface to the said second layer and securing said end portions together with adhesive, the winding being effected under the combined action of a turning force transmitted from the inner wood tube and independent compressing forces applied exteriorly to the tube along separate longitudinal lines thereon, so as to produce a dragging action on the successive convolutions of material, substantially as described.

3. In the art of making a tube composed of paper and wood forming a layer of wood into a convolution, overlapping the end portions of said convolution and uniting them by adhesive material, the inner of said overlapping portions being thinned to produce a smooth cylindrical inner surface, winding a plurality of convolutions of paper in sheet form and in a continuous strip around the convolution of wood while the same is rotated and supported internally, adhesive material being applied between the various convolutions, and combining the convolutions together by balanced rolling dragging compressive pressure applied at substantially equal angular distances apart along longitudinal lines, to the external peripheral surface of the partly formed tube during the winding operation.

4. In the art of making a tube composed of paper and wood, winding a plurality of convolutions of paper in sheet form and in a continuous strip one upon the other while internally and rigidly supported, adhesive being applied between the various convolutions, and combining the convolutions together by balanced rolling, dragging compression pressure applied at substantially equal angular distances apart along longitudinal lines to the external peripheral surface of the partly formed tube during the winding operation, winding an outer layer of wood upon the convolutions of paper under rolling pressure applied at substantially equal angular distances apart along the partly formed tube adhesive being applied between the paper and wood, overlapping the end portions of said outer layer of wood, and connecting the said overlapping portions together by adhesive material during the rolling operation, the outer overlapping portion of said outer layer of wood being tapered to impart a smooth cylindrical external surface to the finished tube.

5. In the art of making a tube composed of paper and wood, bending a sheet of wood into tubular form by means of rolling pressure applied along substantially equally spaced longitudinal lines to the outer surface of the said tube while the same is supported internally, overlapping the end portions of the layer of wood and connecting them together by adhesive material, the inner end portion being of tapered section to form a smooth inner cylindrical surface, winding a number of convolutions of paper upon the wooden tube in one continuous winding operation, under rolling pressure applied at substantially equal angular distances apart along longitudinal lines on the partly formed tube, adhesive material being interposed between the wooden tube and the surrounding convolutions of paper and also between the convolutions of paper, winding an outer layer of wood upon the convolutions of paper under rolling pressure applied at substantially equal angular distances apart along the partly formed tube, adhesive material being interposed between the paper and wood overlapping the end portions of said outer layer of wood, and connecting the said overlapping portions together by adhesive material during the rolling operation, the outer overlapping portion of said outer layer of wood being tapered to impart a smooth cylindrical external surface to the finished tube.

Signed at London, England, this 20 day of December 1905.

WILLIAM LOVE.

Witnesses:
 EMMA GARDNER,
 E. DAVID.